United States Patent [19]

Furuta

[11] Patent Number: 4,948,201

[45] Date of Patent: Aug. 14, 1990

[54] RUBBER CRAWLER

[75] Inventor: Noriaki Furuta, Kanagawa, Japan

[73] Assignee: Bridgestone Corporation, Tokyo, Japan

[21] Appl. No.: 328,987

[22] Filed: Mar. 27, 1989

[30] Foreign Application Priority Data

Mar. 25, 1988 [JP] Japan .................. 63-39416[U]

[51] Int. Cl.$^5$ .............................................. B62D 55/08
[52] U.S. Cl. ........................................ 305/56; 305/24; 305/39
[58] Field of Search ............... 305/35 R, 35 EB, 39, 305/56, 57, 21, 24, 29

[56] References Cited

U.S. PATENT DOCUMENTS 4,678,244  7/1987  Furuta ................................ 305/57

Primary Examiner—Russell D. Stormer
Attorney, Agent, or Firm—Jordan and Hamburg

[57] ABSTRACT

A rubber crawler comprises a plurality of cores embedded perpendicularly to the longitudinal direction of a crawler body made of rubber material, a pair of guide rails on which a track roller rolls, the pair of guide rails being formed on each one of the cores and protruding upwardly therefrom to the side of the crawler body opposite the surface thereof which comes into contact with the ground, and a guide protrusion which is provided between the pair of guide rails and is received within the track roller.

2 Claims, 2 Drawing Sheets

RUBBER CRAWLER

BACKGROUND OF THE INVENTION

1. Field of the Invention

The present invention relates to rubber crawlers adapted for combines and the like, and more specifically to a rubber crawler in which cores are embedded in the rubber material of the crawler body, and a pair of guide rails, on which track rollers roll, are formed on the cores.

2. Description of the Prior Art

Concerning conventional rubber crawlers, generally known is, as shown in FIG. 1, the type in which many cores 2 are embedded perpendicularly to the longitudinal direction of a crawler body 1 made of rubber material; reinforcing members 3 are embedded between the cores 2 and the lower part of the crawler body 1 which comes into contact with the ground; lugs 4 are provided on the surface of the crawler body 1 which comes into contact with the ground; and also a pair of guide rails 101, on which track rollers 100 roll, protrude upwardly from the cores 2 to the side of the crawler body 1 opposite the surface thereof which comes into contact with the ground.

In case of the conventional type of crawlers shown in FIG 1, the track rollers 100 roll on the pair of guide rails 101. Also, generally known is another type in which track rollers 102 roll on the outer planes of the respective guide rails 101 (cf. FIG. 2).

The conventional type shown in FIG. 1 has a weak point in that, when the crawler travels obliquely on a slope, a gap occurs, causing the track rollers 100 to run off the crawler in the direction of the arrow in FIG. 3. In addition, another conventional type shown in FIG. 2 also has one weak point that the track rollers 102 run off the crawler in the direction of the arrow in FIG. 4. Furthermore, in the case of the example shown in FIG. 2, on the section of the crawler on which the track rollers 102 run, i.e., on the surface made of rubber material shown with an arrow C in FIG. 2, the so-called "athlete's foot" phenomenon (or wear) occurs, which is likely to cause the rubber material C of the crawler body 1 to delaminate from the cores 2.

SUMMARY OF THE INVENTION

It is, therefore, the object of the present invention to prevent a track roller from running off a rubber crawler and to provide a rubber crawler which prevents the so-called "athlete's foot" phenomenon.

The above objects are attained by providing between a pair of guide rails a guide protrusion which is received within the track roller.

In the present invention, when the crawler is about to run off the guide rails while traveling obliquely on a slope, the guide protrusion being received within the track roller prevents the track roller from running off. Moreover, as two wheels each on a respective one of the track rollers run on the respective guide rails, the so-called "athlete's foot" phenomenon does not occur.

DETAILED DESCRIPTION OF THE PREFERRED EMBODIMENTS

Figure 1:
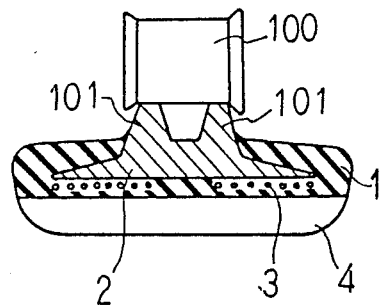
FIGS. 1 and 2 illustrate cross-sectional views of conventional types of crawlers respectively.
Figure 2:
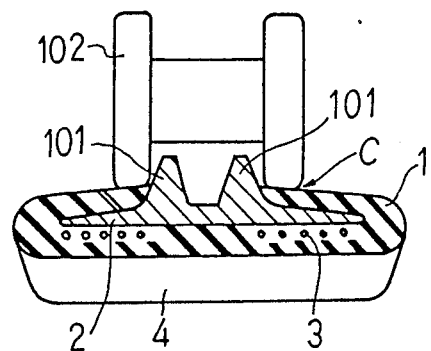
Figure 3:
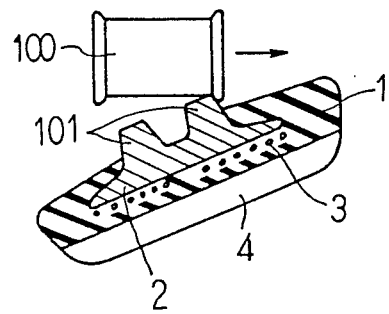
FIGS. 3 and 4 are cross-sectional views showing the state in which crawlers of the respective conventional types are running obliquely on a slope.
Figure 4:
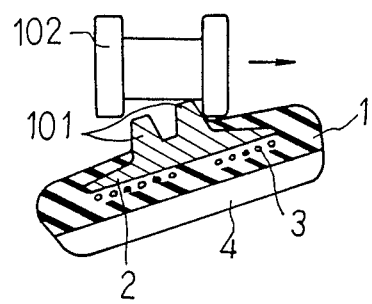
Figure 5:
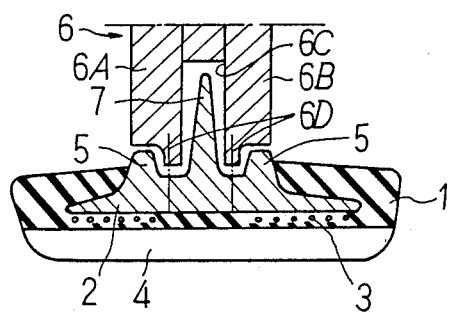
FIG. 5 is a cross-sectional view of a preferred embodiment of the present invention.

Preferred embodiments of the present invention will now be described in the following with reference to the accompanying drawings, FIGS. 5 and 6;

The embodiments of the present invention are similar in structure to the examples of conventional crawlers in that a plurality of cores 2 are embedded perpendicularly to the longitudinal direction of a crawler body 1 made of rubber material; reinforcing members 3 are embedded under the core 2; lugs 4 are provided on the surface of the crawler body 1 which comes into contact with the ground; and also a pair of guide rails 5 protrude upwardly from the cores to the side of the crawler body 1 opposite the surface thereof which comes into contact with the ground.

The track roller 6 has two wheels 6A and 6B each rolling on a respective one of guide rails 5, and a space 6C is provided between the wheels 6A and 6B. Also, roller flanges 6D are each provided facing each other on the wheels 6A and 6B where they come in contact with the respective guide rails 5. A guide protrusion 7 which is received in the space 6C of the track roller 6 is provided between the pair of guide rails 5 formed on the core 2. Under the condition that the track roller 6 rolls on the rubber crawler as mentioned above, the roller flanges 6D of the two wheels 6A and 6B are received in respective concaves situated between the pair of guide rails 5 and the guide protrusion 7. In addition, at the same time, the guide protrusion 7 is received in the space 6C of the track roller 6.

Figure 6:
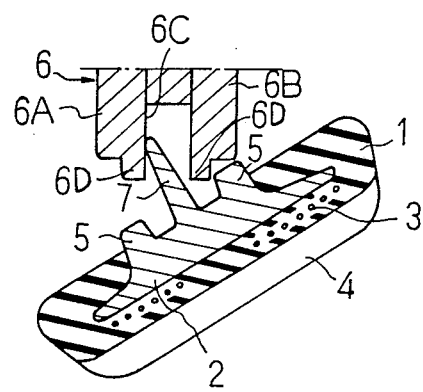
FIG. 6 is a cross-sectional view showing the state in which the crawler of FIG. 5 is running obliquely on a slope.

In case the crawler tilts while traveling obliquely on a slope, the guide protrusion 7 received in the track roller 6, as shown in FIG. 6, keeps the track roller 6 from running off the guide rails 5.

As described above, the present invention has the following aspects: The guide protrusion 7, which is received in the track roller 6, is provided between the pair of the guide rails 5. Thus, the track roller 6 rolls on the pair of guide rails 5, so the so-called "athlete's foot" phenomenon does not occur. Moreover, even when the crawler travels obliquely on a slope, the guide protrusion 7 is still received in the track roller 6. Therefore, this prevents the track roller 6 from running off the crawler.

What is claimed is:

1. A rubber crawler adapted to be used in combination with a track roller, the track roller comprising a pair of coaxial wheels having mutually facing inner surfaces spaced from each other a predetermined distance thereby to form a space having a lateral dimension, parallel to the axis of the wheel, corresponding to said distance, the rubber crawler comprising a crawler body comprised of rubber, a plurality of cores embedded in the crawler body perpendicularly to the longitudinal direction of the crawler body, a pair of guide rails laterally spaced for contact with and rolling thereon of the respective wheels of the track roller, said pair of guide rails being formed on each of said cores and protruding upwardly therefrom above a surface of the crawler body which faces away from a ground contacting surface of the crawler body, and formed on each of said cores between said pair of guide rails a guide protrusion, the guide protrusion protruding upwardly from the core above said surface of the crawler body which faces away from said ground contacting surface, the guide protrusion protruding substantially further than said pair of guide rails and being so dimensioned as to be received in said space between said wheels and to be retained in said space by contact with said inner surface of either of said wheels when the rubber crawler travels obliquely on a slope and, consequently, assumes a lateral orientation oblique to the axis of the wheels.

2. A rubber crawler according to claim 1, in which the wheels of the track roller in combination with which the rubber crawler is adapted to be used each have a single annular flange having an inner face defined by an annular portion of said inner surface of said wheel and each of the cores further comprises respective concavities formed between each of the guide rails and the guide protrusion, each of the concavities being so dimensioned as to receive the flange of a respective one of said wheels.

* * * * *